United States Patent
Hashizawa et al.

(12) 
(10) Patent No.: US 6,257,592 B1
(45) Date of Patent: Jul. 10, 2001

(54) PACKING AND MOUNTING STRUCTURE THEREOF

(75) Inventors: Shigemi Hashizawa; Yutaka Masuda, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/176,259

(22) Filed: Oct. 20, 1998

(30) Foreign Application Priority Data

Oct. 21, 1997 (JP) .................................................... 9-288851

(51) Int. Cl.[7] .................................................... F16L 35/00
(52) U.S. Cl. .............................. 277/596; 277/598; 277/609
(58) Field of Search .................................... 277/598, 609, 277/630, 596

(56) References Cited

U.S. PATENT DOCUMENTS

| | | | | |
|---|---|---|---|---|
| 1,472,133 | * | 10/1923 | Oven ..................................... | 277/596 |
| 1,517,143 | * | 11/1924 | Almquist ............................... | 277/609 |
| 1,539,222 | * | 4/1925 | Turner .................................. | 277/630 |
| 1,659,677 | * | 2/1928 | Welsh ................................... | 277/596 |
| 1,918,478 | * | 7/1933 | Laycock ............................... | 277/596 |
| 1,956,183 | * | 4/1934 | Victor .................................. | 277/598 |
| 4,088,347 | * | 5/1978 | Bruggemann et al. ............... | 277/236 |
| 5,551,705 | | 9/1996 | Chen et al. . | |
| 5,975,539 | * | 11/1999 | Ueda et al. ........................... | 277/593 |

FOREIGN PATENT DOCUMENTS

| | | |
|---|---|---|
| 2546628 A5 | 4/1977 | (DE) . |
| 292510 A5 | 8/1991 | (DE) . |
| 4205442 A1 | 11/1992 | (DE) . |
| 59-86754 | 5/1984 | (JP) . |
| 4-327065 | 11/1992 | (JP) . |
| 5-17956 | 3/1993 | (JP) . |
| 5-237722 | 9/1993 | (JP) . |

* cited by examiner

*Primary Examiner*—Lynne H. Browne
*Assistant Examiner*—Mark Williams
(74) *Attorney, Agent, or Firm*—Finnegan, Henderson, Farabow, Garrett & Dunner, L.L.P.

(57) ABSTRACT

A packing body 11 is accommodated in a packing accommodating groove 29 provided on a seal end surface 26 in one side of a case 19. A mounting projection 12 is provided integrally on the packing body 11 and is protruded from the packing body 11. The mounting projection 12 has a hook pin hole 17, into which a hook pin 32 protruded from a rear side of the seal end surface 26 of the case 19, is inserted, and an engagement hole 18 which is closer to a tip than the hook pin hole 17 and into which a fixing assistant tool 33 for pulling the mounting projection 12 is inserted.

7 Claims, 5 Drawing Sheets

PACKING AND MOUNTING STRUCTURE THEREOF

BACKGROUND OF THE INVENTION

1. Field of the Invention

The present invention relates to a packing provided between a seal end side and a mounting side and to a mounting structure of the packing to be mounted to the seal end side.

2. Description of the Related Art

An annular packing provided between a seal end surface and a mounting surface to which the seal end surface is joined is accommodated in a packing accommodating groove provided to the seal end surface with a seal surface of the packing being projected longer than the seal end surface by a predetermined height.

When the seal end surface is joined to the mounting surface, the packing is held between the seal end surface and the mounting surface under the pressure to closely contact with the mounting surface, and thus the seal end surface and the mounting surface are sealed.

However, only when the packing is accommodated in the packing accommodating groove, an engagement force of the packing with the packing accommodating groove is weak, the packing has a problem such that so at the time of the process of joining the seal end surface to the mounting surface, it is removed from the packing accommodating groove unexpectedly.

Therefore, there have been suggested a packing in which an engagement projection is provided to one side of a rectangular and annular packing body and a hemispheric head section provided to the tip of the engagement projection is engaged with an engagement hole of a housing (see Japanese Utility Model Application Laid-Open No. 5-17956 (1993)), and a packing in which a projection is protruded from a packing body and it is inserted into a mounting hole provided to a housing so that the packing is mounted to the housing.

In such a manner, when an engagement projection is engaged with an engagement hole and a projection is inserted into a mounting hole, unexpected removal, moving and coming-out of the packing are prevented, and when the packing is located in a normal position, secure water resistance can be obtained.

However, in the case where when the packing is mounted to the seal end surface, the engagement projection is engaged with the engagement hole and the projection is inserted into the mounting hole, after the engagement projection is located in the engagement hole and the projection is located in the mounting hole, the packing should be pressed. For this reason, the mounting operation of the packing requires a lot of time, and thus the mounting workability is not good.

In addition, in the case where the packing is removed from the seal end surface at the time of maintenance or the like, it take much time to pull out the engagement projection from the engagement hole or to pull out the projection from the mounting hole, so there arises a problem that removing workability is not good.

Further, in the case where a working space for mounting the packing to the seal end surface is narrow, it becomes more complicated to mount and remove the packing.

SUMMARY OF THE INVENTION

It is an object of the present invention to provide a packing and a mounting structure thereof in which mounting and removal works are easy.

To achieve the object, from a first aspect of the invention, there is provided a packing which comprises a packing body to be accommodated in a packing accommodating groove provided on a seal end side in one side of a case; and a mounting projection which is provided integrally on the packing body and is protruded from the packing body. The mounting projection has a hook pin hole for a hook pin projected from a rear side of the seal end side of the case to be inserted therein; and an engagement hole being closer to a tip then the hook pin hole and for a fixing assistant tool for pulling the mounting projection to be inserted therein. Thereby the seal end side and a mounting side to be joined to the seal end side are sealed with the packing.

In the case where this packing is mounted to the seal end side, the packing body is inserted into the packing accommodating groove on the seal end side, a pulling tool is inserted into the pulling tool hole on the mounting projection so as to be pulled, and the hook pin on the rear side of the seal end side is inserted into the hook pin hole. Next, in the case where the packing is removed from the seal end side, the fixing assistant tool is inserted into the engagement hole and pulls the mounting projection to pull out the hook pin from the hook pin hole, and the packing body is removed from the packing accommodating groove.

In this case, the mounting and removal of the packing can be carried out easily by inserting the fixing assistant tool into the engagement hole provided in the mounting projection, and inserting/removing the hook pin into/from the hook pin hole. Further, even if the mounting work space is narrow, the mounting and removal of the packing can be carried out easily by inserting the fixing assistant tool into the engagement hole on the mounting projection and operating the fixing assistant tool.

In a more preferable embodiment, a plurality of the mounting projections are provided in a circumferential direction of the packing body.

In his packing, since a plurality of the mounting projections are provided in the circumferential direction of the packing body, the packing can be mounted to the seal end side firmly.

From a second aspect of the invention, there is provided a mounting structure of a packing, which comprises equipment having a mounting side; a case which has a seal end side to be joined to the mounting side of the equipment and has a rear side of the seal end side, has a packing accommodating groove on the seal end side, and has on the rear side a mounting concave section communicating with the packing accommodating groove; a hook pin projected from an inner wall in the mounting concave section; a packing body accommodated in the packing accommodating groove and for sealing the mounting side of the equipment and the seal end side of the case; and a mounting projection which is provided integrally on the packing body, is protruded towards the mounting concave section, and has a hook pin hole for the hook pin to be inserted therein and for the packing body to be mounted to the seal end side; and an engagement hole being closer to a tip than the hook pin hole and for a fixing assistant tool to be inserted therein. The mounting projection is pulled towards the book pin hole to insert the hook pin into the hook pin hole by applying the fixing assistant tool.

In this mounting structure of the packing, the packing body is accommodated in the packing accommodating groove on the seal end side, and the mounting projection is protruded towards the mounting concave section on the rear side of the seal end side. Next, the fixing assistant tool is inserted into the engagement hole on the mounting projection and is pulled so that the hook pin is inserted into the hook pin hole on the mounting projection. As a result, the packing is mounted to the seal end side. Moreover, in the case where the packing is removed from the seal end side, the hook pin is pulled out of the hook pin hole on the mounting projection by inserting the fixing assistant tool into the engagement hole on the mounting projection and pulling the fixing assistant tool so that the packing body is removed from the packing accommodating groove.

In this case, the fixing assistant tool is inserted into the engagement hole provided on the mounting projection, and the hook pin is inserted into or removed from the hook pin hole so that the mounting and removal of the packing can be carried out easily. Further, even if the mounting work space is narrow, the fixing assistant tool is inserted into the engagement hole on the mounting projection and the fixing assistant tool is operated so that the mounting and removal of the packing can be carried out easily.

From a third aspect of the invention, there is provided a mounting structure of a packing. The mounting structure comprises a case having one side and another side communicating with the one side, a pin projected from the another side, a packing body provided on the one side which is sealed with the packing body, and a lug provided on the packing body. The lug has a first hole for the pin on the another side to be hooked therein for mounting the packing body to the one side.

In a preferable embodiment, the lug has a second hole to be applied to mounting the packing body through the first hole.

From a fourth aspect of the invention, there is provided a packing. The packing comprises a packing body formed in a predetermined shape and a lug provided on the packing body. The lug has a first hole for the packing body to be mounted therethrough.

In preferable embodiment, the lug has a second hole to be applied to mounting the packing body through the first hole.

BRIEF DESCRIPTION OF THE DRAWINGS

FIG. 1A is a plan view; FIG. 1B is a plan view where 1B portion of FIG. 1A is enlarged; and FIG. 1C is a sectional view taken along a line 1C—1C of FIG. 1B.

DETAILED DESCRIPTION OF THE PREFERRED EMBODIMENTS

Figure 1A:
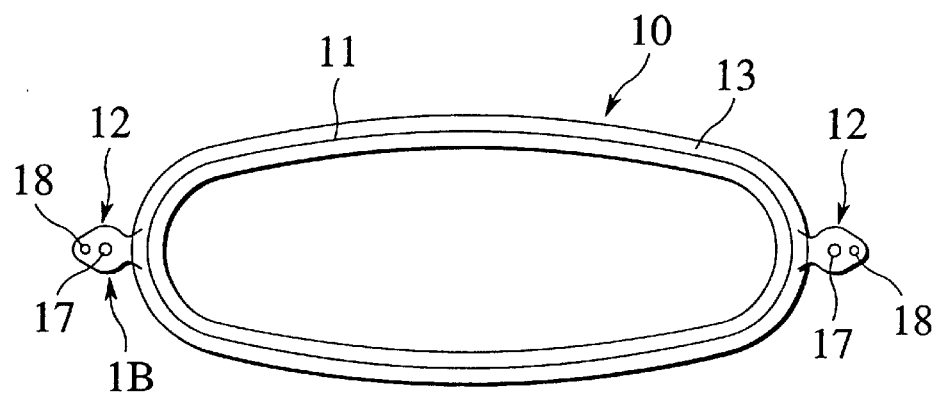
FIGS. 1A, 1B, and 1C show a packing to which the present invention is applied.
Figure 1B:
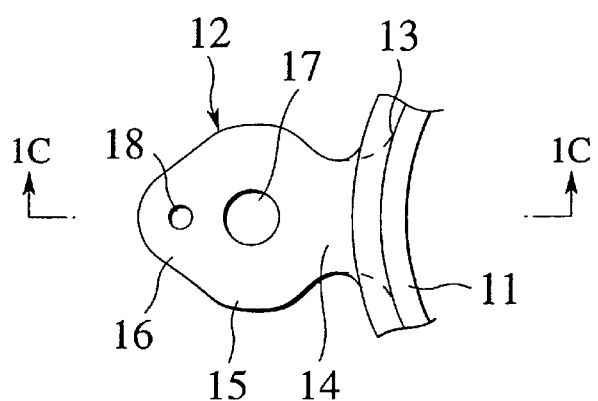
Figure 1C:
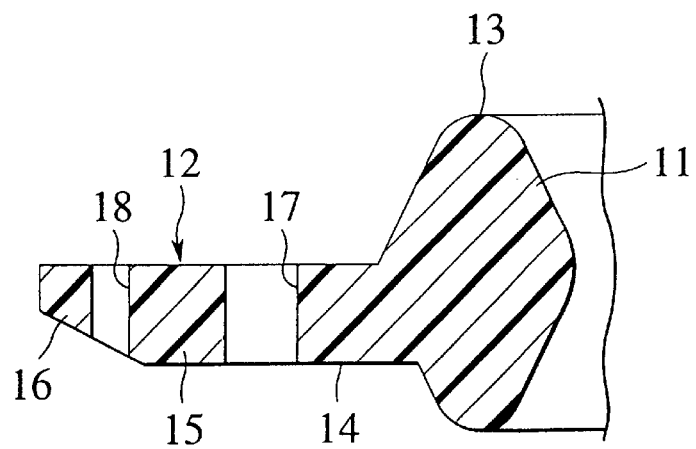

The following will describe embodiments of a packing and a mounting structure of the packing according to the present invention. FIGS. 1A, 1B and 1C show an annular packing 10 according to present embodiment, and FIGS. 2 and 3 show a case 19 having a seal end surface 26 as a seal end side and one side to which the annular packing 10 is mounted.

As shown in FIG. 1A, the annular packing 10 is composed of an annular packing body 11, and mounting projections or lugs 12 provided respectively on both sides of the annular packing body 11. As shown in FIG. 1C, the packing body 11 is formed so as to have a rhombic section, and its upper and lower angular portions are seal surfaces 13. As shown in FIG. 1B, the mounting projection 12 is composed of a root section 14 protruded from the packing body 11, a mounting section 15 which is closer to the tip than the root section 14 and has a larger width than that of the root section 14, and a hook section 16 provided on the tip portion. A hook pin hole 17 as a first hole is bored through an approximately center of the mounting section 15, and an engagement hole 18 as a second hole, whose diameter is smaller than that of the hook pin hole 17 and into which a tip section 34 of a fixing assistant tool 33 (see FIG. 6) is inserted, is bored through the hook section 16. The annular packing 10 is mounted to the seal end surface 26 of the case 19 and is held between the seal end surface 26 and a mounting surface 24 under the pressure (see FIG. 3). For example, the annular packing 10 is made of silicon rubber, has a 30° hardness by JIS-K6301 (Japanese industrial standard), has a waterproof property under 2 atm (atmospheric pressure), and is used in an engine room.

Figure 2:
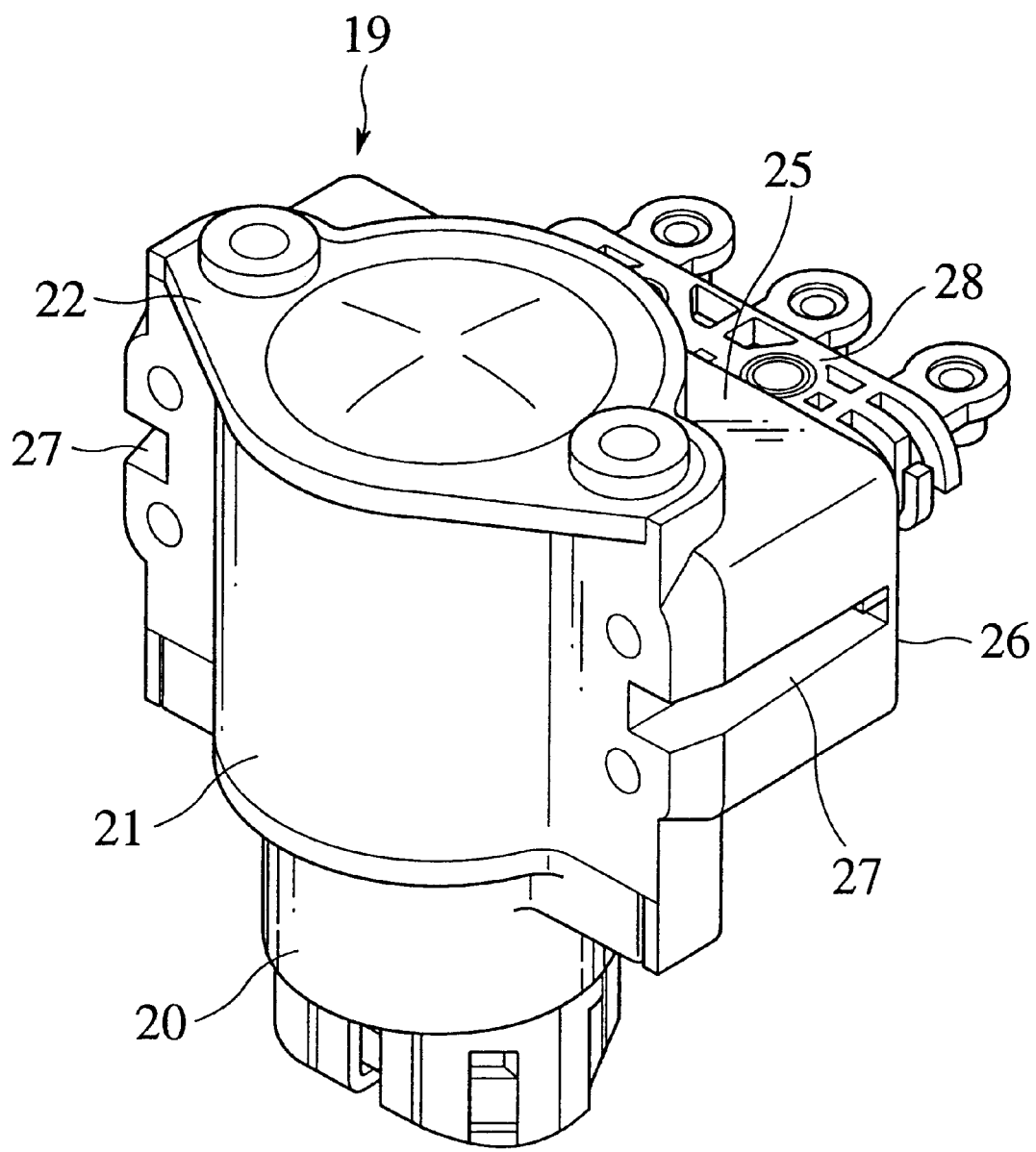
FIG. 2 is a perspective view showing a case having a seal terminal surface to which the packing shown in FIGS. 1A, 1B and 1C is mounted.
Figure 3:
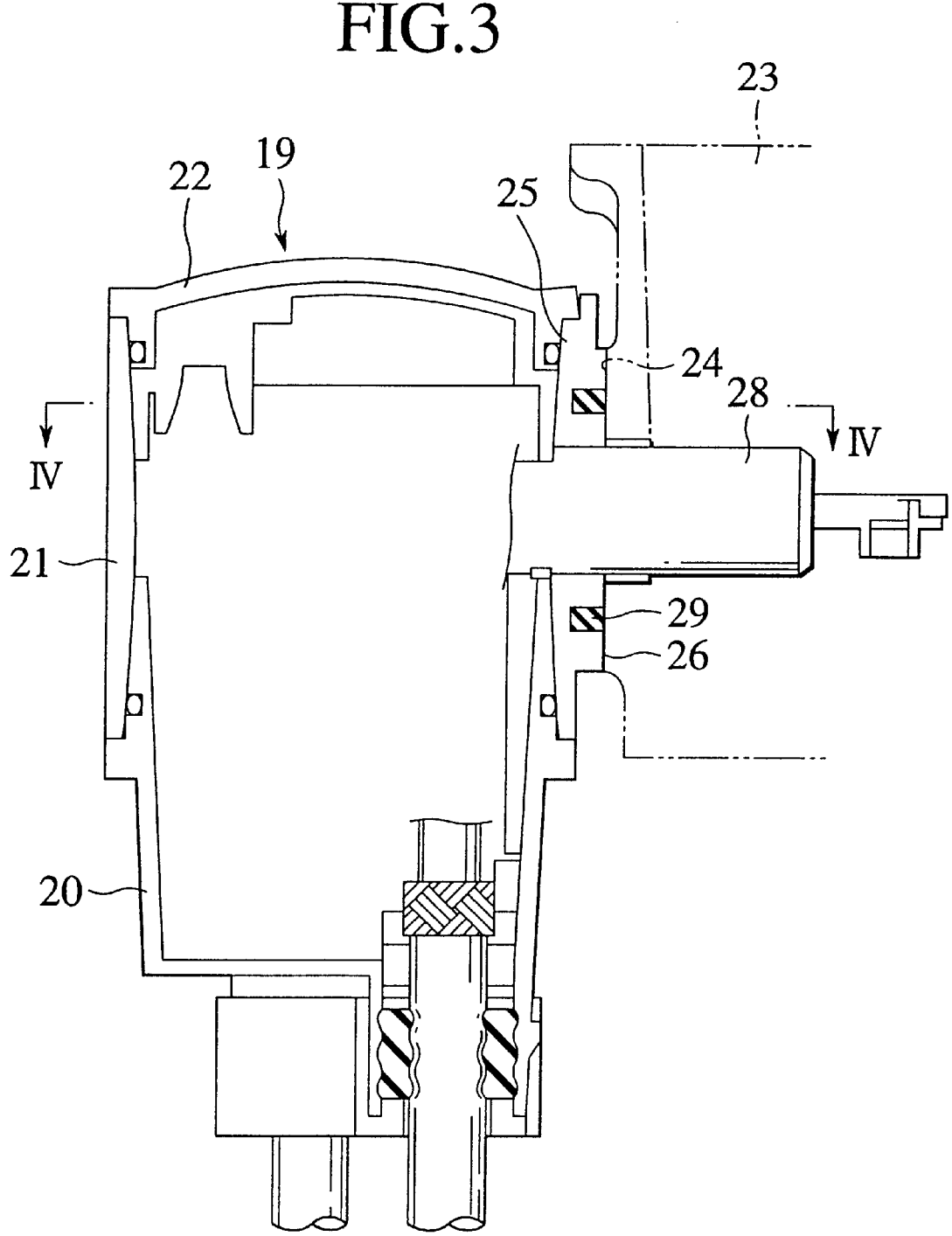
FIG. 3 is a sectional view showing the case having the seal end surface to which the packing shown in FIGS. 1A, 1B and 1C is mounted, and the other equipment to which the case is mounted.

As shown in FIGS. 2 and 3, the case 19 whose whole shape is a drum shape is composed of a lower case 20, an upper case 21 which is mounted integrally with the lower case 20, and a cover case 22 which closes an upper opening 21a of the upper case 21 and seals an inside surrounded by the lower case 20 and the upper case 21. A fixing section 25, which is fixed to a mounting surface 24 of equipment (inverter case) 23 by a screw, is provided on the upper case 21. The seal end surface 26 is formed on the fixed section 25 in the side of the equipment 23, and mounting concave sections 27 are formed respectively on both the sides. Moreover, an insertion section 28 inserted into the equipment 23 is protruded from the central portion of the seal end surface 26 of the fixing section 25.

Figure 4:
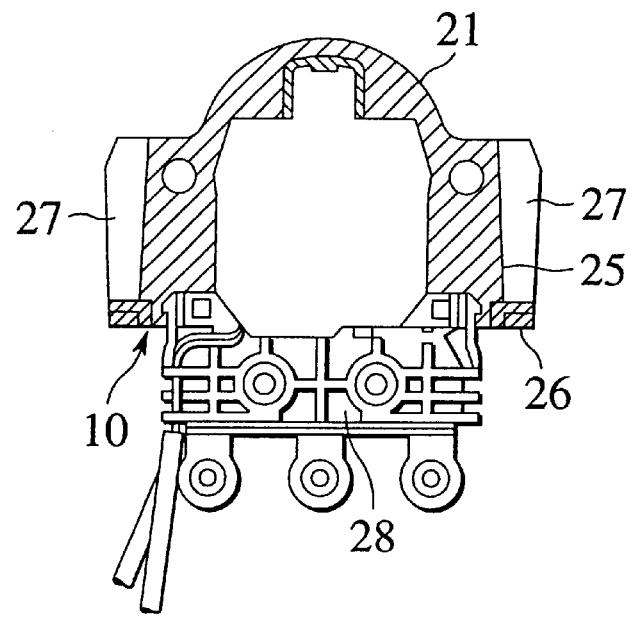
FIG. 4 is a sectional view taken along line IV—IV of FIG. 3 showing the case having the seal end surface to which the packing shown in FIGS. 1A, 1B and 1C is mounted.

As shown in FIGS. 3 and 4, an annular packing accommodating groove 29, in which the packing body 11 is accommodated, is formed around the insertion portion 28 on the seal end surface 26. At both the sides, the inside of the packing accommodating groove 29 in both sides communicates with the mounting concave sections 27 in the rear side of the seal end surface 26 through an opening 30 shown in FIG. 5. The mounting projection 12 of the packing 10 is pushed into the opening 30 communicating with the mounting concave section 27 and the packing accommodating groove 29 and is pushed towards the mounting concave section 27.

Figure 5:
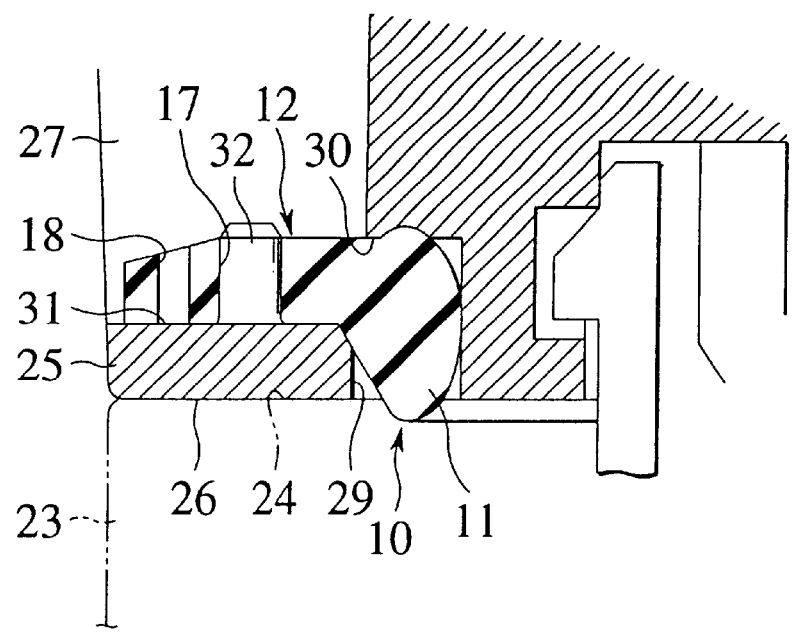
FIG. 5 is a sectional view where one portion of FIG. 4 is enlarged.

As shown in FIG. 5, a hook pin 32 as a pin is protruded from an inner wall 31 of the mounting concave section 27, namely, the rear side as another side of the seal end surface 26. The hook pin 32 is inserted into the hook pin hole 17 on the mounting projection 12 pushed into the mounting concave section 27. Moreover, the packing body 11 is accommodated in the packing accommodating groove 29 with the hook pin 32 being pushed into the hook pin hole 17, and the mounting projection 12 protruded from the packing body 11 is brought into contact with the inner wall 31 of the mounting concave section 27. Therefore, a stress is not applied to the packing 10 with the packing 10 being mounted to the seal end surface 26, so the packing 10 is mounted to the seal end surface 26 naturally.

The following will describe steps of mounting the annular packing 10 to the seal end surface 26.

Figure 6:
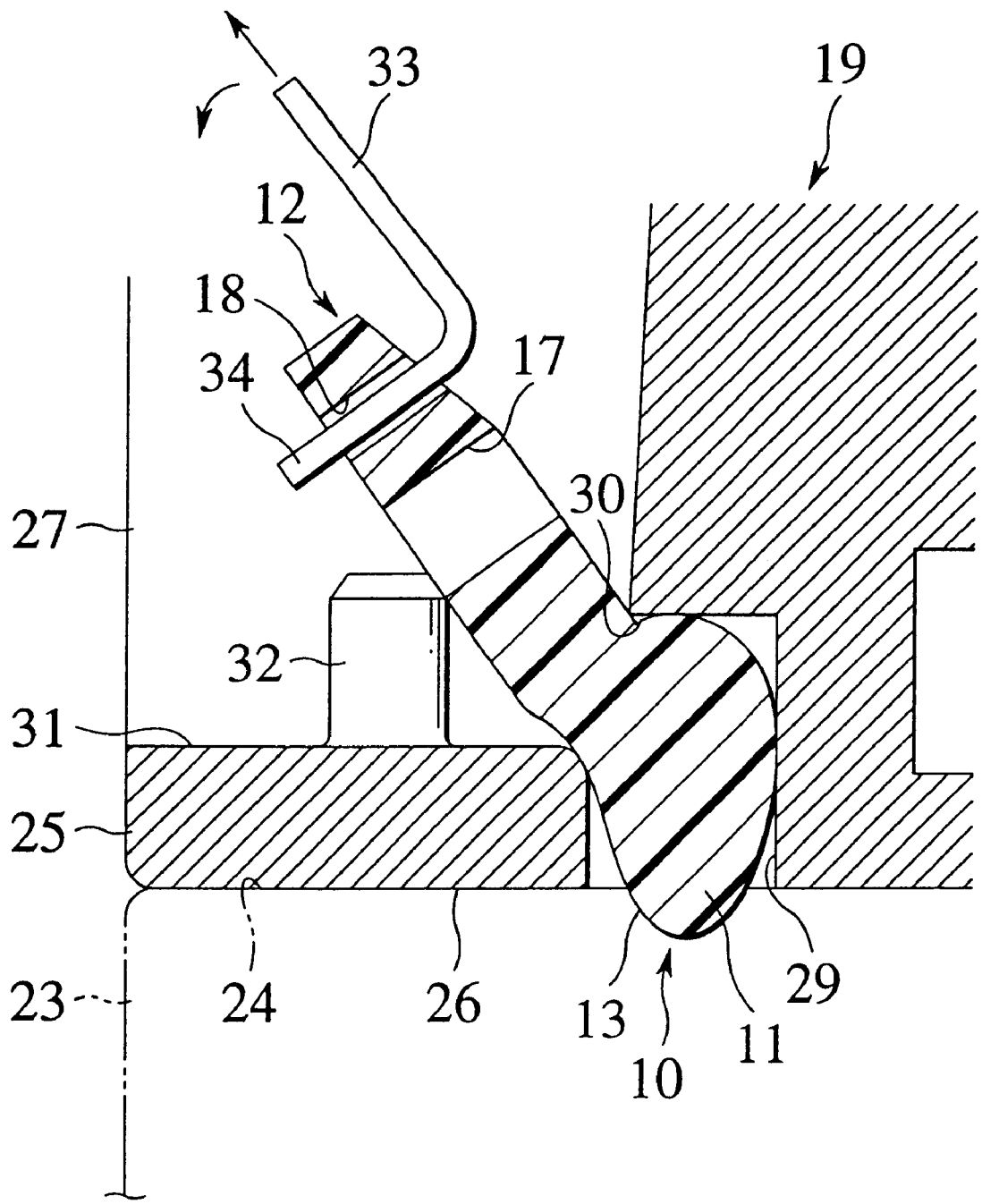
FIG. 6 is a sectional view showing a state that a hook pin is about to be inserted into a hook pin hole by using a fixing assistant tool.

The annular packing body 11 shown in FIG. 1A is inserted into the packing accommodating groove 29 on the seal end surface 26 as one side and simultaneously the mounting projections 12 as a lug on both the sides are inserted respectively into the mounting concave sections 27 of another side through the openings 30. In this state, as shown in FIG. 6, the mounting projections 12 are brought into contact with the hook pin 32 as a pin and are slanted in the mounting concave sections 27.

From this state, the bar-shaped tip section 34 of the fixing assistant tool 33 which is bent at approximately right angle is inserted into the engagement hole 18 as a second hole. Then, the fixing assistant tool 33 is pulled upward and slantly and is turned towards the inner wall 31 of the mounting concave section 27 do that, as shown in FIG. 5, the hook pin 32 is inserted into the hook pin hole 17 as a first hole. In this state, the mounting projection 12 is not pulled from the packing body 11, so that packing 10 is in a natural state such that a stress is not applied thereto.

In addition, the tip of the mounting projection 12 is in the mounting concave section 27 and is brought into contact with the inner wall 31 of the mounting concave section 27. In the above manner, the packing 10 is mounted to the seal end surface 26.

Next, in order to remove the packing 10 in the state shown in FIG. 5, the tip of the mounting projection 12 is turned to a direction where it is removed from the inner wall 31 of the mounting concave section 27. This operation may be performed by hooking the tip section 34 of the fixing assistant tool 33 on the tip of the mounting projection 12, or another bar-shaped fixing assistant tool may be used. When the mounting projection 12 is turned to the direction where it is removed from the inner wall 31 of the mounting concave section 27, as shown in FIG. 6, the hook pin 32 is pulled out of the hook pin hole 17, and the mounting projection 12 is brought into contact with the hook pin 32 to be slanted.

From this state, when the packing body 11 is pulled out of the packing accommodating groove 29 on the seal end surface 26, the mounting projection 12 passes from the mounting concave section 27 through the opening 30 and enters the packing accommodating groove 29 to the pulled out of the packing accommodating groove 29. In the above manner, the packing 10 is removed from the seal end surface 26.

According to the present embodiment, when the fixing assistant tool 33 is inserted into the engagement hole 18 provided on the mounting projection 12 and the fixing assistant tool 33 is operated, the hook pin 32 can be inserted into the hook pin hole 17 easily, and thus the workability of mounting the packing 10 to the seal end surface 26 can be improved.

In addition, when the mounting projection 12 is operated by the fixing assistant tool 33 or the like, the hook pin 32 can be pulled out of the hook pin hole 17 easily, and thus the workability of removing the packing 10 from the seal end surface 26 can be improved.

Further, even in the case where the mounting work space is narrow, namely, the mounting concave section 27 is narrow and thus a finger of an operator is hardly put thereinto, the packing can be mounted and removed easily by inserting fixing assistant tool 33 into the engagement hole 18 on the mounting projection 12 and operating it therein.

In addition, in the holding structure of the packing 10 according to the present embodiment, since the mounting projection 12 provided integrally on the packing body 11 is hooked on the hook pin 32, the packing body 11 does not come out of the packing accommodating groove 29 on the seal end surface 26 unexpectedly, so the packing 10 can be mounted to the seal end surface 26 firmly.

Moreover, the packing 10, which was mounted to the seal end surface 26 firmly, can be removed from the seal end surface 26 easily by using the fixing assistant tool 33.

In addition, in the holding structure of the packing 10 according to the present embodiment, a stress is not applied to the packing 10 with the packing 10 being mounted to the seal end surface 26, and thus the packing 10 is mounted to the seal end surface 26 naturally. Therefore, the packing 10 is pressed against the mounting surface 24 uniformly with it being held between the seal end surface 26 and the mounting surface 24 under the pressure, so satisfactory water resistance can be maintained.

Further, in the present embodiment, since the mounting projections 12 are provided respectively to both the sides of the packing body 11, the packing 10 can be mounted to the seal end surface 26 more securely, and thus the packing 10 can be securely prevented from coming out of the packing accommodating groove 29 unexpectedly.

In addition, unlike conventional manners, a pressing force for engaging an engagement projection in an engagement hole is not required, and it can be visually confirmed easily from the outside as to whether or not the hook pin 32 is inserted into the hook pin hole 17. For this reason, the packing 10 can be easily and securely mounted to the seal end surface 26 in the normal state.

Moreover, in the packing 10 of the present embodiment, since the board-shaped mounting projections 12 having the hook pin hole 17 and the engagement hole 18 are formed integrally with the outer circumference of the annular packing body 11, the shape is simple and the manufacturing cost is not expensive.

Further, in the present embodiment, since only the mounting concave section 27, into which the tip of the fixing assistant tool 33 can be inserted and operated, is provided on the rear side of the seal end surface 26, the shape of the case 19 to which the seal end surface 26 is provided can be simple.

What is claimed is:

1. A packing body to be accommodated in a packing accommodating groove provided on a seal end side in one side of a case to seal the seal end side and a mounting side to be joined to the seal end side, the packing body comprising:

an integral mounting projection protruded from the packing body, the mounting projection having:

a hook pin hole for insertion of a hook pin projected from a rear side of the seal end side of the case; and an engagement hole located outwardly from the hook pin hole to receive a fixing assistant tool for pulling the mounting projection.

2. The packing according to claim 1, wherein a plurality of the mounting projections are provided in a circumferential direction of the packing body.

3. A mounting structure of a packing, comprising:

equipment having a mounting side;

a case having a seal end side to be joined to the mounting side of the equipment, the case having a rear side of the seal end side, the case having a packing accommodating groove on the seal end side, the case having on the rear wide a mounting concave section communicating with the packing accommodating groove;

a hook pin projected from an inner wall in the mounting concave section;

a packing body accommodated in the packing accommodating groove, the packing body for sealing the mounting side of the equipment and the seal end side of the case; and a mounting projection provided integrally on the packing body, the mounting projection protruded towards the mounting concave section, the mounting projection having:
- a hook pin hole for the hook pin to be inserted therein, the hook pin hole for the packing body to be mounted to the seal end side; and
- an engagement hole being closer to a tip than the hook pin hole, the engagement hole for a fixing assistant tool to be inserted therein, the fixing assistant tool for pulling the mounting projection towards the hook pin hole to insert the hook pin into the hook pin hole.

4. A mounting structure of a packing:

a case having one side, the case having another side communicating with the one side;

a pin projected from the another side;

a packing body provided on the one side, the packing body for the one side to be sealed therewith; and a lug provided on the packing body, the lug having a first hole for the pin on the another side to be hooked therein for mounting the packing body to the one side.

5. A mounting structure of a packing according to claim 4, wherein the lug has a second hole to be applied to mounting the packing body through the first hole.

6. A packing comprising:

a packing body of predetermined shape and having an edge; and a lug integrally protruding from the edge of the packing body, the lug having a first hole for mounting the packing body, and a second hole for receiving a fixing took for mounting the packing body through the first hole.

7. The packing of claim 6,
wherein the packing body is annular, the first hole positioned at a central part of the lug, and the second hole positioned at a distal end of the lug.

* * * * *